(12) United States Patent
Knebel et al.

(10) Patent No.: US 7,475,320 B2
(45) Date of Patent: Jan. 6, 2009

(54) FREQUENCY MODIFICATION TECHNIQUES THAT ADJUST AN OPERATING FREQUENCY TO COMPENSATE FOR AGING ELECTRONIC COMPONENTS

(75) Inventors: Daniel R. Knebel, Mahopac, NY (US); William Robert Reohr, Ridgefield, CT (US); Li-Kong Wang, Montvale, NJ (US)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 10/643,549

(22) Filed: Aug. 19, 2003

(65) Prior Publication Data
US 2005/0043910 A1    Feb. 24, 2005

(51) Int. Cl.
*G06F 11/32* (2006.01)
*G06F 11/18* (2006.01)

(52) U.S. Cl. ......................... 714/746; 714/47
(58) Field of Classification Search ................. 714/746, 714/799, 1, 2, 3, 25, 47; 700/79; 713/501
See application file for complete search history.

(56) References Cited

U.S. PATENT DOCUMENTS

| | | | | |
|---|---|---|---|---|
| 3,575,256 A * | 4/1971 | Jania et al. | ................ | 180/176 |
| 4,698,587 A * | 10/1987 | Burns et al. | ................ | 324/765 |
| 4,845,419 A * | 7/1989 | Hacker | ................ | 320/136 |
| 5,124,849 A * | 6/1992 | Chur | ................ | 360/31 |
| 5,127,008 A * | 6/1992 | Bassett et al. | ................ | 714/726 |
| 5,331,579 A * | 7/1994 | Maguire et al. | ................ | 703/2 |
| 5,758,133 A * | 5/1998 | Evoy | ................ | 713/501 |
| 5,936,448 A * | 8/1999 | Ohie et al. | ................ | 327/205 |
| 5,956,289 A * | 9/1999 | Norman et al. | ................ | 365/233 |
| 6,253,358 B1 * | 6/2001 | Takahashi | ................ | 716/6 |
| 6,525,585 B1 * | 2/2003 | Iida et al. | ................ | 327/279 |
| 6,525,603 B1 * | 2/2003 | Morgan | ................ | 330/52 |
| 2002/0047745 A1 * | 4/2002 | Kolanek | ................ | 330/149 |
| 2002/0167282 A1 * | 11/2002 | Kirkpatrick et al. | ................ | 315/248 |

OTHER PUBLICATIONS

Wu et al., Bipolar Bootstrapped Multi-emitter BiCMOS (B2M-BiCMOS) Logic for Low-Voltage Applications, Electronics, Circuits, and Systems, 1996, vol. 2, pp. 1174-1177.*

* cited by examiner

*Primary Examiner*—Cynthia Britt
*Assistant Examiner*—Dipakkumar Gandhi
(74) *Attorney, Agent, or Firm*—Ryan, Mason & Lewis, LLP

(57) ABSTRACT

A number of performance parameters for the electronic system are determined at a particular age of the electronic system. The performance parameters can be correlated to maximum operating frequency of electronic components of the electronic system for the particular age of the electronic system. Operating frequency of the electronic components is adjusted in accordance with the performance parameters. The performance parameters may be predetermined (such as through reliability and burn-in testing), determined during the life of the electronic system, or some combination of these. Performance parameters can comprise prior operating frequencies, hours of operation, ambient temperature, and supply voltage. Performance parameters can comprise performance statistics determined using age-monitoring circuits, where an aged circuit is compared with a circuit enabled only for comparison. Performance statistics may also be determined though error detection circuits. If an error is detected, the operating frequency can be reduced.

19 Claims, 6 Drawing Sheets

FREQUENCY MODIFICATION TECHNIQUES THAT ADJUST AN OPERATING FREQUENCY TO COMPENSATE FOR AGING ELECTRONIC COMPONENTS

FIELD OF THE INVENTION

The present invention relates to electronic systems and, more particularly, relates to frequency regulation for electronic components of the electronic systems.

BACKGROUND OF THE INVENTION

Modern electronic systems, such as computers, contain clock generation circuits that generate one or more frequencies at which electronic components in the system operate. Electronic systems are tested to guarantee system reliability at a given operating frequency. One typical reliability test is called wear-out acceleration. As is known in the art, wear-out acceleration is used to accelerate the aging of electronic systems in order to determine possible mechanisms that cause failure or reduced reliability as electronic systems age. Wear-out acceleration operates components beyond their specified operating range, for instance, at one and a half times their nominal voltage and at elevated temperatures for a specified time period, typically hours or days instead of years.

Information from wear-out acceleration is used to adjust such things as frequency of operation of the electronic system. A low frequency is chosen based on the wear-out acceleration information so that the electronic system will operate correctly when the system has been aged. Frequency of operation of an electronic system therefore has a "guard band" used to ensure proper operation over the life of the electronic system.

There is a need to provide techniques for modifying the frequency of electronic systems as the systems age to minimize the guard band and operate a system at near peak performance over its entire lifetime.

SUMMARY OF THE INVENTION

Exemplary aspects of the present invention provide frequency modification techniques that adjust an operating frequency of an electronic system to compensate for one or more aging electronic components. In general, exemplary aspects of the present invention will vary the operating frequency over the life of the electronic system.

One or more performance parameters for the electronic system are determined for a particular age of the electronic system. The performance parameters can be correlated to maximum operating frequency of the electronic system for the particular age of the electronic system. The operating frequency of electronic components of the electronic system is adjusted in accordance with the performance parameters.

The operating frequency of the electronic system may be adjusted according to a predetermined schedule (e.g. determined before the electronic system is first operated), adjusted dynamically during the life of the electronic system, or adjusted by some combination of these. In all cases, one or more performance parameters influence the choice of an adjustment to operating frequency for a particular age of the electronic system.

A more complete understanding of the present invention, as well as further features and advantages of the present invention, will be obtained by reference to the following detailed description and drawings.

DETAILED DESCRIPTION OF PREFERRED EMBODIMENTS

Figures 1A, 1B:
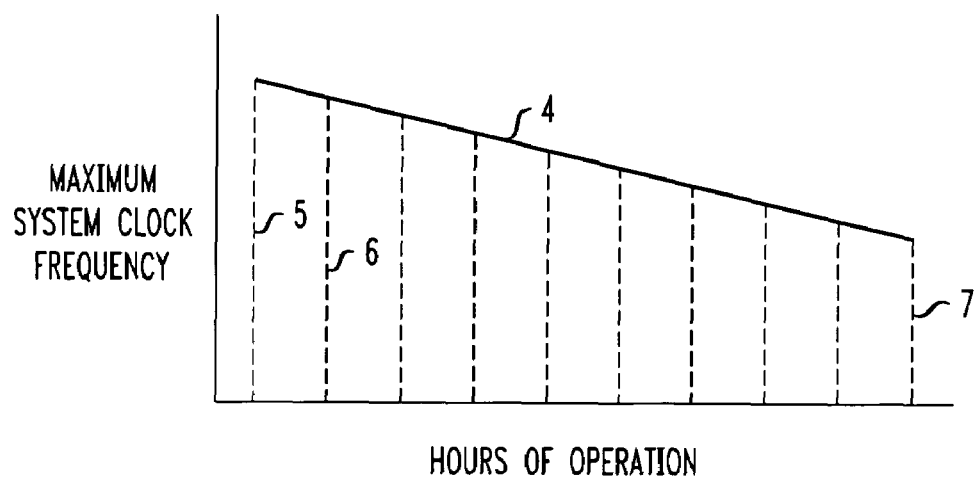
FIG. 1A is an exemplary graph of the performance parameter of maximum system operating frequency (in this example, maximum system clock frequency) versus hours of operation, in accordance with an aspect of present invention.
FIG. 1B is an exemplary table showing hours of operation and modified operating frequencies (in this example, maximum system clock frequency), in accordance with a first and a second embodiment of the present invention.

A variety of mechanisms cause electronic component failure over time. One such mechanism is the "hot carrier" effect. Hot carriers are high energy electrons or holes that, in part, compose the source-to-drain-electron current traversing a channel underlying a gate of a field effect transistor (FET). For example, hot electrons in an N-type FET (NFET), which uses electrons as carriers, have enough energy to surmount the energy barrier of a portion of the gate insulator. Over time, some of the hot electrons get trapped in the gate insulator. The presence of the electric field effectively increases the NFET threshold voltage, thereby making the NFET less conductive as more of the electrons collect in the gate insulator over time. This wear-out effect may cause a system failure when transistor speed is reduced sufficiently enough that signals cannot be generated at the rate of the system clock.

Wear-out effects mean that electronic components are no longer are able to operate at the speed to which the electronic components were capable of originally. Electronic systems are therefore, as described previously, designed with a "guard band" that enables proper operation for an aged system, and unfortunately this guard band reduces the maximum performance of a new system.

Thus, the maximum operating frequency of an electronic system usually deteriorates over its lifetime due to many wear-out phenomena. Presently, a fixed frequency is imposed on the system for its entire lifetime, excluding the techniques of voltage and frequency scaling for power management, as known in the art. The fixed frequency includes a guard band to account for the aging of its most sensitive components. The initial frequency of an electronic system may be increased if the system frequency could later be reduced to accommodate the effects of aging.

Exemplary aspects of the present invention use performance parameters of an electronic system in order to gauge how quickly the system ages and, with this knowledge, adjust the operating frequency at which the electronic system or electronic components thereof should operate. Examples of performance parameters may include prior operating frequencies, predetermined operating frequencies, total hours of operation, operating voltages, and operating temperatures. Performance parameters may also include a multiplicand of a base frequency, such as "1.0" or "0.9," that, when multiplied with the base frequency, yields the predetermined operating frequency.

In exemplary aspects of the present invention, techniques are proposed for modifying the operating frequency of an electronic system, the operating frequency of some of its electronic components, or the operating frequency of all of its electronic components. A system in accordance with certain embodiments of the present invention would initially offer higher performance than conventional systems provide, and then as the effects of aging manifest themselves, the performance of the system would be incrementally reduced by incrementally adjusting its frequency until it reached the level of performance available in today's systems that is the performance specified for end-of-life. After each incremental reduction in frequency, it might be necessary to reduce the workload of the system and to redirect it to other systems to prevent congestion. Given that hardware prices fall precipitously each year as a result of sharper photolithography and rapidly improving manufacturing methods, the total cost of additional capacity would be minimal.

A performance parameter may include, e.g., total hours of operation, a prior operating frequency, predetermined operating frequency, operating voltage, or ambient temperature of the electronic system. A performance parameter may similarly be a multiplicand that, when multiplied with a base frequency, is the equivalent of the predetermined operating frequency. The multiplicand may vary over time, just as the predetermined operating frequency is expected to vary over time.

Maximum operating frequency is generally considered the frequency above which errors will occur during operation of the electronic system or its electronic components. An indirect method for determining maximum frequency would involve measuring the switching speed of a test circuit located within the same chip or package as the system or its component. In contrast, a direct method for determining maximum frequency would involve running system at frequencies at or above maximum frequency. Error checking circuits embedded within the actual logic circuits of the electronic component would detect when the operating frequency had exceeded the maximum frequency.

The correlation between maximum operating frequency and performance parameters may be determined through reliability testing, such as wear-out acceleration. Such testing generally entails placing higher supply voltages and ambient temperatures on samples of the electronic system. The samples are then "aged" and information can be determined about how the maximum operating frequency of the electronic system or electronic components thereon should be changed over the life of a substantially equivalent electronic system. Predetermined operating frequencies and corresponding performance parameters may be pre-loaded into the electronic system prior to its sale. The performance parameter in this situation may be total hours of operation. The predetermined operating frequencies may be the maximum operating frequencies for corresponding hours of operation. In general, however, the predetermined operating frequencies will be set less than the maximum operating frequencies. When the electronic system meets a particular age, defined by the total hours of operation, a corresponding predetermined operating frequency is used as the operating frequency for the electronic components.

Performance parameters may also be dynamically determined as the system ages, such as through performance statistics gathered from feedback circuits. The feedback circuits measure performance of the electronic system though various techniques. For instance, feedback circuits may be age-monitoring circuits, where an aged circuit is compared with a circuit enabled only for comparison. The circuit enabled only for comparison is called a "new" circuit. Performance statistics for the two circuits can then be used to adjust operating frequency for electronic components of the electronic system. Additionally, feedback circuits may be error detecting circuits. When an error occurs, the operating frequency can be lowered from a current operating frequency. Execution can be caused to begin at a point before the error occurred, and then it can be determined if the error reoccurs. If the error does not reoccur, the lowered operating frequency serves as the new operating frequency.

Additionally, through networks or other links, near maximum operating frequencies and corresponding performance parameters could be loaded into an electronic system while it was operating in the field. For instance, a company could determine through testing of an electronic system in its laboratory that a similar electronic system in the field should run at certain operating frequencies when the electronic system reaches particular age milestones.

In this invention, multiple techniques are proposed to control the operating frequency of a system in order to control the performance of an electronic system over its entire life cycle. In a first exemplary embodiment, a control unit is described that would propagate scheduled frequency reductions, based on prior reliability testing. Frequency reductions in a second exemplary embodiment could be disseminated through a network as data are gathered and updated from hardware measurements taken on a test system or systems located in a company laboratory or on other similar electronic systems located elsewhere. In a third exemplary embodiment, a control unit is proposed that would reduce the frequency of the system based on feedback gathered from age-monitoring circuits. In a fourth exemplary embodiment, a control unit is proposed that would reduce the frequency of the system upon detection of an error and reset the instruction queue of the system to a state before the error occurred so that the error would be nullified.

To relate a maximum operating frequency of a system to an age of the system, it is useful to consider hardware measurements and circuit analysis. An age of the system can be measured through, for instance, hours, days, or years of operation of the electronic system. Hardware measurements can provide calibration statistics to improve the accuracy of the circuit analysis. To reduce analysis time, electronic systems may be subjected to operating conditions that accelerate aging and wear-out, such as higher voltages (e.g., one-and-one-half times that of the maximum voltage provided in the specification for the electronic system) and higher temperatures (e.g., 140 degrees Celsius instead of 100 degrees Celsius typically provided in the specification for the electronic system), as is well known to those familiar with the art of reliability testing. These results can then be used to develop a relationship between operating frequency and performance parameters. As previously described, examples of such performance parameters include, but are not restricted to, prior operating frequency, temperature, supply voltage, and hours of operation. From this relationship, a table (e.g., a "wear-out" table) of values may be created and stored so that the operating frequency of a system may be adjusted at periodic intervals to compensate for the effects of aging. The values include predetermined operating frequencies and corresponding hours of operation. Adjustments to the operating frequency may be made based on assessment of performance parameters gathered before an electronic system is put into use (according to the first exemplary embodiment of the invention), after the electronic system is put into use (according to the second exemplary embodiment of the invention), or a combination of the two.

FIG. 1A depicts a graph comparing the maximum system operating frequency (in this example, maximum system clock frequency) to hours of operation, and FIG. 1B depicts a wear-out table, extracted from the graph in FIG. 1A, that tabulates the frequency deterioration for discrete time intervals. Curve 4 relates every hour of operation to a maximum operating frequency. The information in FIGS. 1A and 1B are determined from reliability testing.

As previously described, it is possible to determine from reliability testing how an electronic system, and its constituent electronic components, perform over their lifetimes. This type of information can be used to form a table, such as shown in FIG. 1B, that an electronic system will use, in part, to govern its operating frequency as it ages. The table may include maximum operating frequencies for selected ages of the electronic system.

As stated above, maximum operating frequency is generally considered the frequency above which errors will occur during operation of the electronic system or its electronic components. As used herein, "operating frequency" is generally synonymous to "clock frequency," and is the frequency supplied to the electronic components. However, it should be noted that a clock (usually having an "oscillator") may have its output multiplied in order to create an operating frequency. In the examples of FIGS. 1A and 1B, it is assumed that the operating frequency and clock frequency are the same (e.g., such that all electronic components on the electronic system have the same input frequency of the clock frequency), although as shown below, this does not have to be the case.

In the example of FIG. 1A, maximum operating clock frequency falls as the system ages. Segment 5 represents initial operation (e.g., zero hours of operation). The point where curve 4 intersects segment 5 is a maximum operating clock frequency at which a new system can reliably operate. Segment 6 represents a time after "A" hours of system operation, and the point where it intersects curve 4 is the maximum clock frequency after "A" hours of operation. Segment 7 represents hours of operation at the end-of-life of the system. In the absence of a method for adjusting system performance, such as that described herein, the system operating frequency would initially have to be set to the end-of-life frequency at the intersection of curve 4 and segment 7. The method described herein allows the system clock frequency to be set initially to a higher value, the point where curve 4 and segment 6 intersect or slightly lower than the frequency at this point. This intersection will be designated as F1. F1 will be stored as a predetermined operating frequency for the time period between segments 5 and 6. A predetermined operating frequency is preferably as close to maximum operating frequency as possible, but will generally be set less than the maximum operating frequency.

A wear-out table 9, such as the table shown in FIG. 1B, may be generated from curve 4. Table 9 relates a set of hours of operation to a set of predetermined operating frequencies at which the system will properly operate. Frequency F1, which was determined from information previously described and shown in FIG. 1A, is entered in the first data row of table 9, and relates that frequency to the number of hours of operation that the system may reliably operate at frequency F1. Likewise, the remaining data rows of the example table relate other predetermined system operating frequencies to hours of operation over the lifetime of the system.

Although FIG. 1A shows a linear relationship between hours of operation and maximum system clock frequency, the relationship need not be linear.

In a first exemplary embodiment, a control unit propagates scheduled frequency reductions in productivity through a system clock. The method 200 depicted in FIG. 2 describes how the wear-out table 9, shown in FIG. 1B, may be used in a processing system depicted in FIG. 3 to control system operating frequencies throughout the lifetime of a system. In the flow chart 200 of FIG. 2, the current hours of operation (e.g., dates) are periodically compared to the hours (e.g., dates) listed in a wear-out schedule (step 201), which has, for instance, an adjustment log and a fixed wear-out table. An adjustment is needed when the current date exceeds the next incremental date entry, defined as the date entry in the fixed wear-out table that immediately follows the date entry presently stored in the adjustment log. If an adjustment is needed (step 202=YES), frequency adjustment values are loaded from the fixed wear-out table (step 203), in which fixed entries obtained from previously performed reliability testing have been pre-loaded in the user's system; otherwise the process is ended (step 204). After the frequency adjustment values have been loaded, the needed adjustments and a time to schedule them may be broadcast to the system or system operator (step 205). If the system or system operator approves the plan (step 206), then the system is restarted at the scheduled time with the adjusted operating frequency (step 207), otherwise a new adjustment plan is formulated and broadcasted. After the system is successfully restarted with the new adjusted operating frequency, the adjustment is logged (step 208).

Adjustment values can be frequencies, which are used to modify the frequency at which a clock oscillates. Additionally, the adjustment values can be multiplicands used to modify a clock oscillation frequency. For example, a 1.0 gigaHz (GHz) base clock frequency could be multiplied by 1.0 (i.e., yielding 1.0 GHz for an operating frequency) for the first five years of the age of the electronic system, then by 0.9 (i.e., yielding 0.9 GHz for an operating frequency for the next five years of the age of the electronic system. The adjustment values can be any value suitable for modifying the operating frequency for the electronic system or electronic components thereof.

In a second exemplary embodiment, a control unit (called a "wear-out clock") propagates frequency reductions that are updated from external sources. Entries for a wear-out table may be collected from reliability tests run at the laboratory of the company providing the electronic system on a similar or identical system, called the test system, to the end-user system that requires frequency adjustments. These results may then be fed to a wear-out clock 311 of the end-user system, depicted in FIG. 3 (and described in more detail hereafter), via a direct network input 331 that connects the end-user system through a communication network to the company providing the electronic system. Entries for the wear-out table may be generated by the test system or systems only a short time in advance of their use in the end-user system. The frequency of the oscillator may be adjusted according to the logic of the flow chart 200 of FIG. 2. Method 200 also describes how to control the operating frequency of the system receiving periodic maximum frequency updates.

Figure 2:
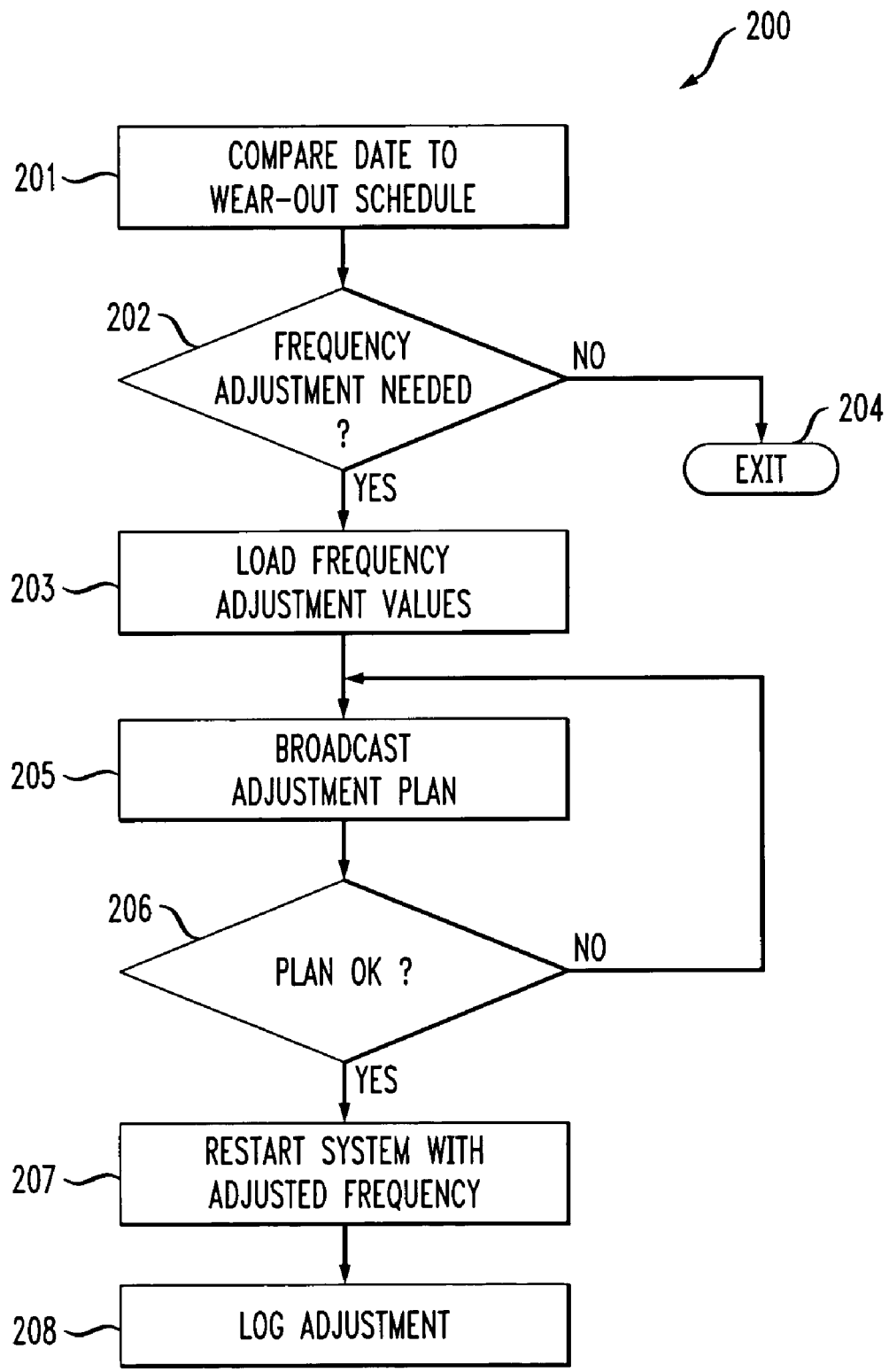
FIG. 2 is an exemplary flow chart of a method for scheduled modification of operating frequency, in accordance with the first and the second embodiment of the present invention.

In the flow chart 200 of FIG. 2, the current hours of operation (e.g., dates) are periodically compared to the hours (e.g., dates) listed in a wear-out schedule (step 201), which has, for instance, an adjustment log and a wear-out table. A frequency adjustment is needed (step 202) when the current date exceeds the next incremental date entry, defined as the date entry in a wear-out table that immediately follows the date entry presently stored in the adjustment log. If a frequency adjustment is needed, frequency adjustment values are loaded from a transient wear-out table (step 203), in which entries can be generated just in time for their use in the user's system; otherwise the process is ended (step 204). After the frequency adjustment values have been loaded, the needed adjustments and a time to schedule them may be broadcast to the system or system operator (step 205). If the system or system operator approves the plan (step 206), then the system is restarted at the scheduled time with the new adjusted frequency (step 207), otherwise a new adjustment plan is formulated and broadcasted. After the system is successfully restarted, the frequency adjustment is logged (step 208).

It is also possible to assess the performance of the electronic system while it is in use. Performance parameters in this example can include statistics about performance, such as prior operating frequencies, temperature, and supply voltage. The performance parameters can then be used to adjust operating frequency of the electronic system or electronic components of the electronic system. The performance may not only be gauged through operating frequency but may also be assessed through performance metrics such as operations per second, throughput, error rate and the like. It is additionally possible to monitor, indirectly or directly, actual maximum frequency of an electronic system or its components while its is operating.

Figure 3:
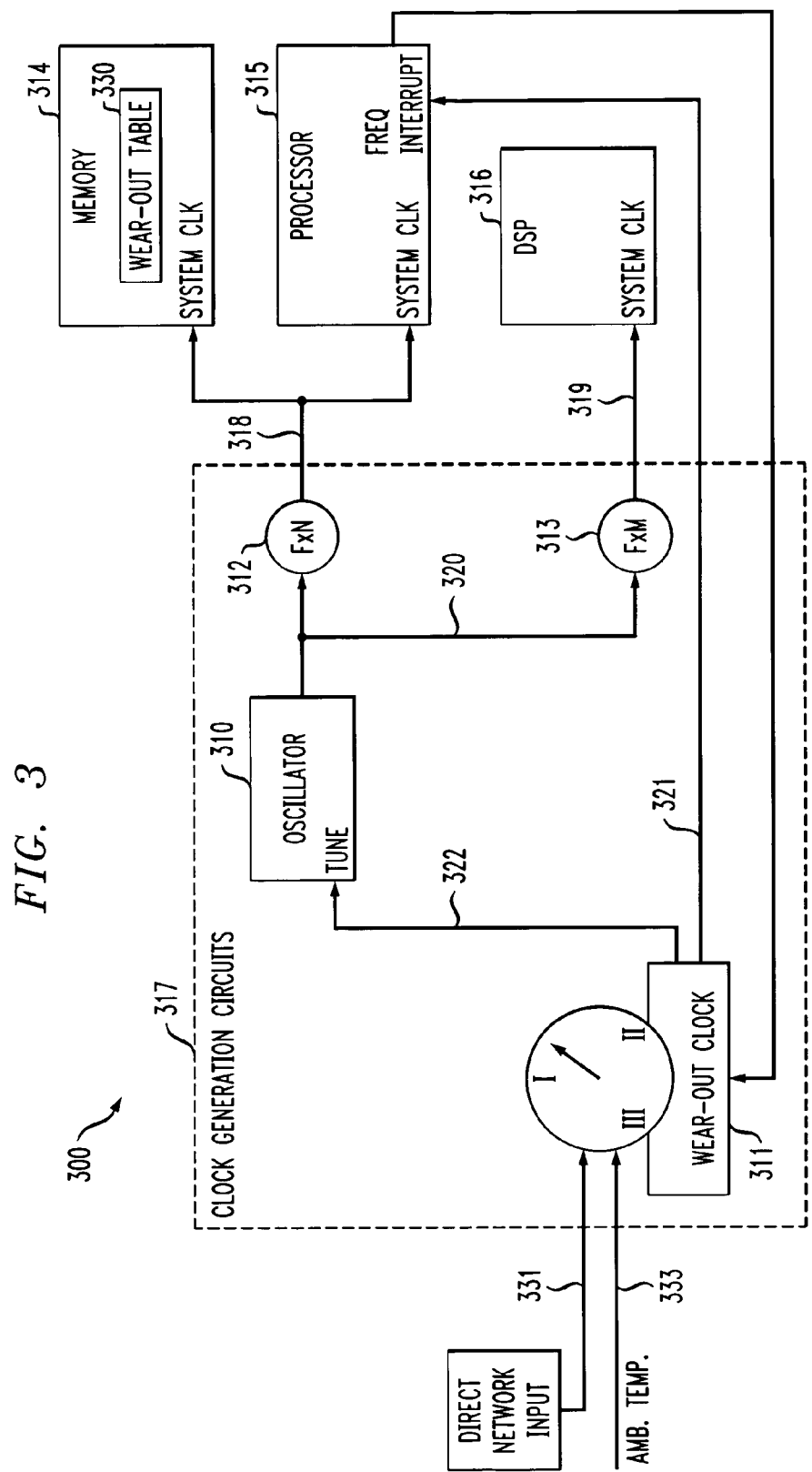
FIG. 3 is an exemplary system implementing the method of FIG. 2, in accordance with the first and the second embodiment of the present invention.

A synchronously-clocked computer system 300, depicted in FIG. 3, has (a) various electronic components that are synchronous logic chips in this example, such as a memory 314, a processor 315, and a digital signal processor (DSP) 316, which exchange information among themselves and the outside world through data busses (not shown), and (b) clock generation circuits 317, parts of which may reside on the various system logic chips 314, 315, 316 or other dedicated chips. It should also be noted that the "logic chips" may be integrated into one or more integrated circuits. Each logic chip receives a system clock, "System Clk," developed within and broadcast from the clock generation circuits 317. An oscillator 310 residing within the clock generation circuits 317 generates the fundamental clock frequency that is boosted to various desired frequencies by frequency multipliers 312, 313. Frequency multipliers 312, 313 multiply the fundamental frequency of the oscillator 310 by N and M, respectively, where N and M may be integers equal to or greater than one. Interconnects 318, 319 distribute the boosted frequencies to the various system electronic components, which in this example are logic chips 314, 315, 316. The boosted frequencies carried over interconnects 318, 319 are operating frequencies.

Via interconnect 322, a wear-out clock 311 adjusts the frequency of the oscillator according, for instance, to the logic of the flow chart of FIG. 2. Moreover, via interconnect 321, the wear-out clock 311 can trigger an interrupt within the processor 315 to broadcast the adjustment plan as described with respect to step 205 of the flow chart 200 of FIG. 2. Input from the system or system administrators can be fed back to the wear-out clock 311 by another interconnect (not shown) or through the processor 315. In summary, the wear-out clock 311 regulates the frequency of a synchronously clocked computer system 300 by adjusting the operating frequencies to maximize the performance of the system's aging components, memory 314, processor 315, and DSP 316. It should be noted that the wear-out clock 311 can also contain a processor and memory (not shown). The processor implements method 200 and the memory is used to store the instructions to cause the processor to implement method 200, along with storing any associated wear-out tables or other information needed during implementation of method 200.

In this example, a wear-out table 330, such as that shown in FIG. 1B, is shown in memory 314. The wear-out table 330 may also be stored in wear-out clock 311 and may be received via direct network input 331 or through another network connection (not shown). Furthermore, the wear-out table 330 may be programmed from the factory with particular information, but new information may be received over the direct network input 331 or other network input (not shown). The ambient temperature 333 may also be used to adjust frequency of the computer system 300 or components thereon. Higher ambient temperature 333, over sufficient time, has the effect of causing faster wear-out, and the wear-out clock 311 can take the higher ambient temperature 333 into account when determining what the operating frequency of the computer system 300 should be. Ambient temperature is another example of a performance parameter.

Exemplary embodiments of the present invention described herein may be implemented as an article of manufacture comprising a machine-readable medium, as part of memory 314 for example, containing one or more programs that when executed implement embodiments of the present invention. For instance, the machine-readable medium may contain a program configured to perform steps in order to program or modify the wear-out clock 311. The machine-readable medium may be, for instance, a recordable medium such as a hard drive, an optical or magnetic disk, an electronic memory, or other storage device.

Figure 4:
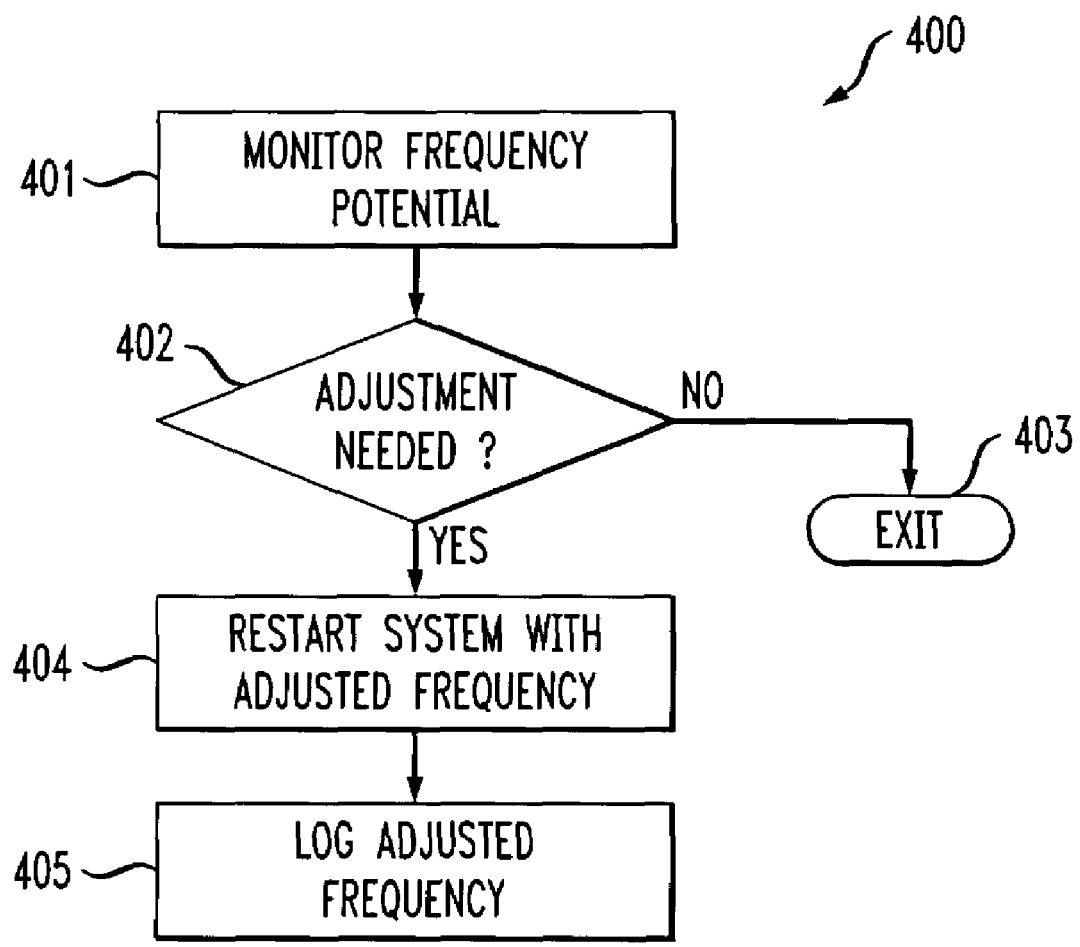
FIG. 4 is an exemplary flow chart of a method using the performance parameter of determined performance in order to modify operating frequency, in accordance with a third embodiment of the present invention.
Figure 5:
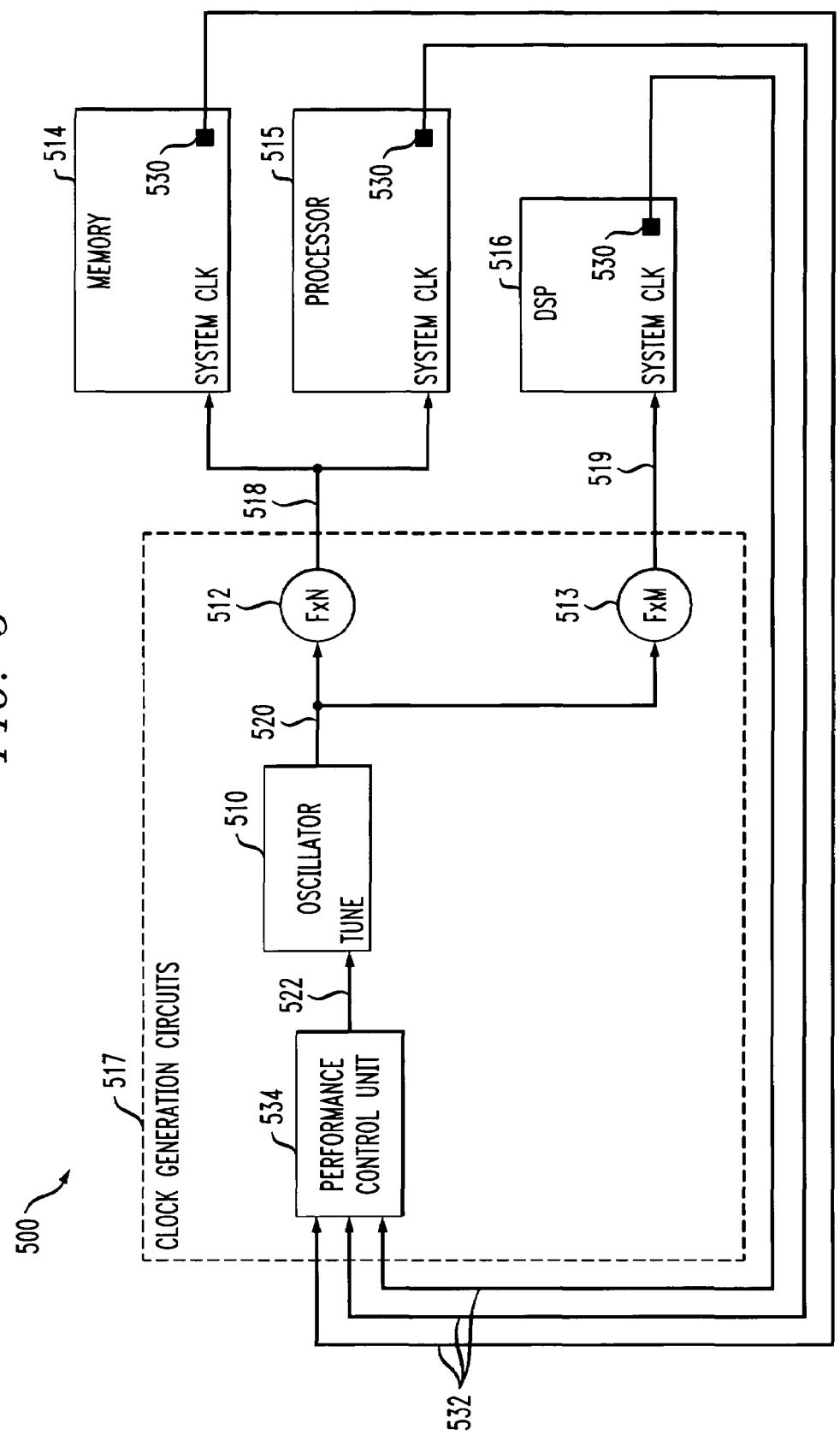
FIG. 5 is an exemplary system implementing the methods of FIG. 4 and FIG. 6, in accordance with the third and a fourth embodiment, respectively, of the present invention.

In a third exemplary embodiment, age-monitoring circuits continuously monitor performance parameters of an electronic system (such as circuit switching speed or frequency) for a performance control unit within which the age of the system may be established and through which a corresponding maximum operating frequency performance may be adjusted to accommodate the effects of aging. The method 400 depicted in FIG. 4 describes how the performance control unit 534, for instance, of FIG. 5 adjusts frequency performance over the lifetime of a system. In the flow chart 400 of FIG. 4, the steps include monitoring the frequency potential of a system (step 401), assessing whether or not an adjustment to its operating frequency is needed (step 402), exiting the flow chart if no adjustment is needed (step 403), and, if an adjustment is needed, restarting system with adjusted performance (step 404), and logging adjusted performance (step 405). Generally, after a period of time, method 400 will return to step (step 401). The decision (step 402) to reduce the operating frequency of the system is based on whether or not the system performance has deteriorated to the level where it has little or no guard-band left in operating performance. If performance has substantially deteriorated, the operating frequency of the system is reduced. To ensure functionality at all times, the operating frequency should be kept slightly below the performance potential. FIG. 5 illustrates an example of how the operating frequency of the electronic system, or electronic components thereof, can be changed. For the third exemplary embodiment, the feedback circuits 530 are age-monitoring circuits.

In FIG. 5, a synchronously-clocked computer system 500 with feedback has (a) various electronic components that are synchronous logic chips, such as a memory 514, a processor 515, and a DSP 516, which exchange information among themselves and the outside world through data busses (not shown), (b) clock generation circuits 517, parts of which may reside on the synchronous logic chips 514, 515, 516 or other dedicated chips, and (c) feedback circuits 530, which also may reside on the synchronous logic chips 514, 515, 516. It should be noted that the logic chips can be integrated into one or more integrated circuits. Each logic chip receives a system clock, "System Clk," developed within and broadcast from the clock generation circuits 517. An oscillator 510 residing within the clock generation circuits 517 generates a fundamental clock frequency that is boosted to various desired operating frequencies by frequency multipliers 512, 513. Frequency multipliers 512, 513 multiply the fundamental frequency of the oscillator 510 by N and M, respectively, where N and M may be integers equal to or greater than one. Interconnects 518, 519 distribute the boosted frequencies (i.e., the operating frequencies) to the various electronic components, which in this example are synchronous logic chips 514, 515, 516.

Via an interconnect 522, a performance control logic unit 534 adjusts the operating frequency of the oscillator 510. After gathering performance parameters, such as circuit switching speed or oscillator frequency, from the feedback circuits located on the synchronous logic chips 514, 515, and 516, the performance control unit 534 decides whether the operating performance of the system requires adjustment, according to the procedure set forth in the flow chart 400 of FIG. 4 or the procedure set forth in the flow chart 600 of FIG. 6. The performance control unit 534 regulates the frequency of a synchronously clocked computer system 500 by adjusting the frequency to maximize the performance of its aging components while maintaining their functionality. It should be noted that the performance control unit 534 may also include a processor and memory (not shown). In this case, the processor would implement method 400 and the memory would store the instructions to cause the processor to implement method 400 and would also store any associated data from the feedback circuits 530 or other information needed during implementation of method 500.

Age-monitoring circuits—feedback circuits 530 for the exemplary third embodiment—are known in the art of analog electronics. Aging statistics may be obtained by comparing a continuously operating test circuit, the aging circuit, with a test circuit that is enabled only for the comparison, the new circuit. Such aging statistics could be extracted as the time difference between two signals, one that traverses an aged inverter chain and another that traverses a new inverter chain.

In a fourth exemplary embodiment, the frequency of the system may be adjusted over the system lifetime by detecting and reacting to system failures. Error detecting circuits are inserted in system components in a fashion similar to the age monitoring circuits described previously with respect to the third exemplary embodiment, the primary difference between fourth and third embodiments being that error detecting circuits assess the logic circuits directly whereas the age-monitoring circuits run independent tests to gauge performance. In the fourth embodiment, the feedback circuits 530 are more narrowly defined as error detecting circuits that are suitable for detecting errors in the logic circuits (as opposed, for instance, to detecting errors caused by software).

Figure 6:
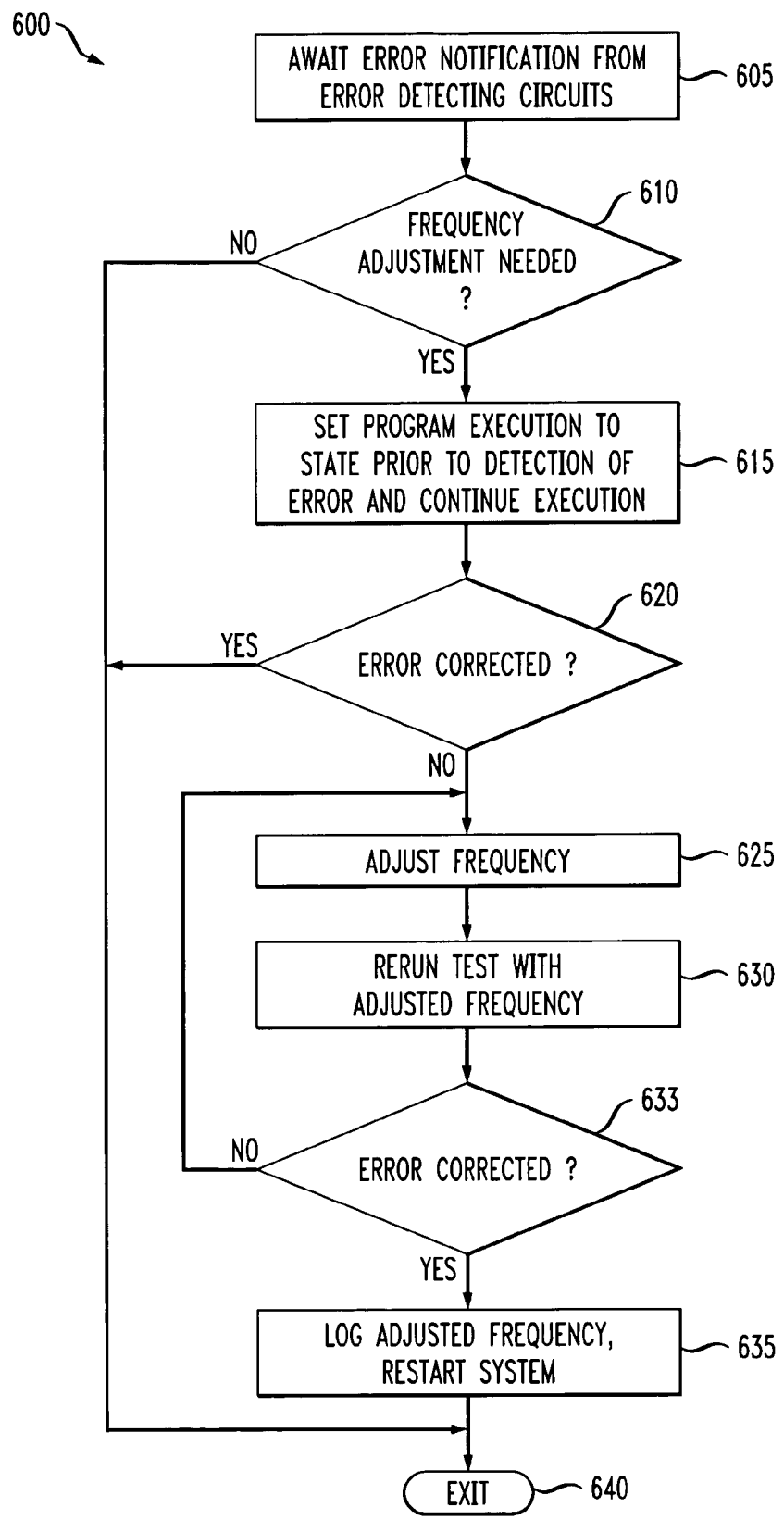
FIG. 6 is an exemplary flow chart of a method using the performance parameter of error determination in order to modify operating frequency, in accordance with the fourth embodiment of the present invention.

In addition, a system 500 according to the fourth embodiment may be designed to include elements to correct errors, or to back up the program flow to a state previous to the detected error and re-execute the instructions. Hence even though the third and fourth embodiments employ the same feedback apparatus (depicted in FIG. 5), a new method 600, depicted in FIG. 6, is devised to handle the error or errors detected prior to restarting the system being restarted with the adjusted frequency.

When an error is detected by one of the error detecting circuits, the system enters an error diagnostic mode of operation (step 605). In general, the diagnostic operating mode makes a decision as to whether a change in operating frequency is needed (step 610), and if so, resets the system operating frequency and logs the event as described previously. The operations of the diagnostic operating mode are generally pre-defined, along with the other operating characteristics of the system. These operations may include procedures developed from previous experience with system reliability and may use pre-collected data from extended life testing, or they may include dynamic tests and decisions based on results of these tests.

An example of a possible diagnosis of a system error is to first reset the system to a state before the detected error occurred, and re-execute the instructions up to the point where the error was detected (step 615). If the error does not occur in this test (step 620=YES), the diagnostic system may log the results of the test and return the system to normal operation (step 640). If the error does occur in the test (step 620=NO), the diagnostic system may lower the system operating frequency (step 625) and re-run the test at the lower operating frequency (step 630). When lowering the operating frequency eliminates the error (step 633=YES), corrective action is logged, and the system is returned to normal operating mode at the lower frequency (step 635). If the error is not corrected (step 633=NO), the method continues at step 625, where another operating frequency is selected. Method 400 ends in step 640.

Exemplary aspects of the present invention may also be implemented along with power saving features. For example, the operating frequency does not always have to be near the maximum operating frequency for the electronic system or its constituent electronic components at a particular age. Thus in some instances, a lower operating frequency could be selected to reduce power, while in other instances, when performance is required, an operating frequency close to the maximum operating frequency could be selected according to the techniques of exemplary aspects of the present invention.

Additionally, it may be possible to use the techniques of exemplary aspects of the present invention to raise operating frequency in the short term. For instance, if ambient temperature remains low as the system runs, operating frequency may be able to be raised based on the relatively low ambient temperature.

It is to be understood that the embodiments and variations shown and described herein are merely illustrative of the principles of this invention and that various modifications may be implemented by those skilled in the art without departing from the scope and spirit of the invention.

What is claimed is:

1. A method of frequency modification for one or more electronic components in an electronic system, the method comprising the steps of:

determining, at a particular age of the electronic system, one or more performance parameters for the electronic system, the one or more performance parameters correlated with maximum operating frequency of one or more electronic components of the electronic system for the particular age of the electronic system; and adjusting an operating frequency of the one or more electronic components from the electronic system in accordance with the one or more performance parameters.

2. The method of claim 1, wherein the step of adjusting adjusts the operating frequency to an adjusted operating frequency, and wherein the adjusted operating frequency is less than or equal to the maximum operating frequency of the one or more electronic components for the particular age of the system.

3. The method of claim 1, wherein a given one of the one or more performance parameters can be converted to a selected operating frequency to be used in the step of adjusting.

4. The method of claim 3, wherein the given performance parameter comprises a multiplicand used to convert a base frequency to the selected operating frequency to be used in the step of adjusting.

5. The method of claim 1, wherein the step of determining a performance parameter further comprises the steps of determining whether the particular age of the electronic system is a predetermined age, and determining an operating frequency from the one or more performance parameters when the particular age is the given age.

6. The method of claim 5, wherein a given one of the one or more performance parameters comprises a predetermined operating frequency to be used in the steps of determining and adjusting.

7. The method of claim 1, wherein the step of determining, at a particular age of the electronic system, a performance parameter for the electronic system, further comprises the step of gathering, at the particular age of the electronic system, performance statistics from one or more feedback circuits, and determining whether actual performance of the electronic system should be adjusted by using the performance statistics.

8. The method of claim 7, wherein the step of gathering, at the particular age of the electronic system, performance statistics from one or more feedback circuits, further comprises the step of gathering, at the particular age of the electronic system, performance statistics from one or more age-monitoring circuits.

9. The method of claim 8, wherein the step of gathering, at the particular age of the electronic system, performance statistics from one or more age-monitoring circuits further comprises the step of determining, at the particular age of the electronic system, a given performance statistic by comparing speed of an aged circuit with speed of a test circuit that is enabled only for the comparison, wherein the aged circuit has been operated for approximately the particular age.

10. The method of claim 7, wherein the step of gathering, at the particular age of the electronic system, performance statistics from one or more feedback circuits, further comprises the step of gathering, at the particular age of the electronic system, performance statistics from one or more error detecting circuits.

11. The method of claim 10, wherein:
the step of gathering further comprises the step of determining that one or more errors have occurred; and
the step of adjusting an operating frequency further comprises the steps of lowering operating frequency from a current operating frequency, beginning execution at a point before the one or more errors occurred, determining if the one or more errors reoccur, and if the one or more errors do not reoccur, leaving the lowered operating frequency as the current operating frequency.

12. The method of claim 11, wherein the step of adjusting further comprises, before the step of lowering operating frequency, the steps of beginning execution at a point before the one or more errors occurred, determining if the one or more errors reoccur, and if the one or more errors do not reoccur, leaving current operating frequency alone.

13. The method of claim 1, wherein the one or more performance parameters comprise one or more of previous operating frequency, ambient temperature, hours of operation, and supply voltage.

14. The method of claim 1, wherein the one or more performance parameters are stored performance parameters and wherein the method further comprises the step of performing reliability testing to determine wear-out information comprising the stored performance parameters.

15. The method of claim 14, wherein the stored performance parameters comprise predetermined ages and predetermined operating frequencies at corresponding ones of the predetermined ages.

16. The method of claim 14, wherein the step of performing reliability testing further comprises the step of determining one or more prior operating frequencies of the electronic system, one or more ambient temperatures surrounding the electronic system, and one or more supply voltages of the electronic system.

17. The method of claim 16, further comprising the step of providing supply voltage for the electronic system that is higher than nominal supply voltage.

18. The method of claim 16, further comprising the step of providing ambient temperature surrounding the electronic system that is higher than nominal ambient temperature.

19. The method of claim 1, wherein the performance parameters are received from an external source.

* * * * *